United States Patent
Polz et al.

(10) Patent No.: US 6,755,268 B1
(45) Date of Patent: Jun. 29, 2004

(54) FRONT HOOD ASSEMBLY

(75) Inventors: Andreas Polz, Gelsenkirchen (DE); Peter Schlegel, Wuppertal (DE); Jörg Schneppenheim, Germering (DE)

(73) Assignee: Edscha AG, Remscheid (DE)

( * ) Notice: Subject to any disclaimer, the term of this patent is extended or adjusted under 35 U.S.C. 154(b) by 0 days.

(21) Appl. No.: 09/979,203

(22) PCT Filed: May 17, 2000

(86) PCT No.: PCT/DE00/01598

§ 371 (c)(1),
(2), (4) Date: Feb. 15, 2002

(87) PCT Pub. No.: WO00/69704

PCT Pub. Date: Nov. 23, 2000

(30) Foreign Application Priority Data

May 17, 1999 (DE) .......................... 199 22 107

(51) Int. Cl.[7] .............................................. B60R 21/34
(52) U.S. Cl. ................... 180/69.21; 180/271; 180/274; 296/187.04; 296/193.11
(58) Field of Search ................................ 180/271, 274, 180/69.2, 69.21; 296/189, 187.04, 193.11; B60R 21/34; B62D 25/10, 25/12

(56) References Cited

U.S. PATENT DOCUMENTS

| | | | | |
|---|---|---|---|---|
| 4,125,170 A | * | 11/1978 | Botz | 180/69.21 |
| 5,385,212 A | * | 1/1995 | Cady et al. | 180/69.21 |
| 6,217,108 B1 | * | 4/2001 | Sasaki | 296/194 |
| 6,237,992 B1 | * | 5/2001 | Howard | 296/194 |
| 6,257,657 B1 | * | 7/2001 | Sasaki | 296/194 |
| 6,293,362 B1 | * | 9/2001 | Sasaki et al. | 180/274 |
| 6,330,734 B1 | * | 12/2001 | Cho | 16/376 |
| 6,345,679 B1 | * | 2/2002 | Sasaki | 180/274 |
| 6,415,882 B1 | * | 7/2002 | Schuster et al. | 180/69.21 |
| 6,439,330 B1 | * | 8/2002 | Paye | 180/69.21 |
| 6,442,801 B1 | * | 9/2002 | Kim | 16/361 |
| 6,588,526 B1 | * | 7/2003 | Polz et al. | 180/69.21 |

FOREIGN PATENT DOCUMENTS

| | | |
|---|---|---|
| DE | 2711338 | 9/1978 |
| DE | 2711339 | 9/1978 |
| DE | 2737876 | 3/1979 |
| DE | 2841315 | 4/1980 |
| DE | 2922893 | 12/1980 |
| DE | 3047969 | 7/1982 |
| DE | 3916739 | 11/1990 |
| DE | 69400889 | 12/1994 |
| DE | 19721565 | 12/1997 |
| DE | 19710417 | 9/1998 |
| DE | 19712961 | 10/1998 |
| EP | 0509690 | 10/1992 |
| FR | 2690405 | 10/1993 |
| JP | 04212677 | 8/1992 |
| JP | 11291948 | 10/1999 |
| JP | 2000006846 A | * 1/2000 |
| JP | 2000016340 A | * 1/2000 |

* cited by examiner

*Primary Examiner*—Paul N. Dickson
*Assistant Examiner*—Deanna Draper
(74) *Attorney, Agent, or Firm*—Davidson, Davidson & Kappel, LLC

(57) ABSTRACT

A front hood assembly has a front hood of a motor vehicle that is hinged to the chassis of the motor vehicle via a hinge, the front hood being lockable via at least one hood lock. The hinge is plastically deformed under the impact of a collision with a pedestrian. The assembly provides a protection for pedestrians that is technically feasible and can be implemented at low costs.

18 Claims, 7 Drawing Sheets

FRONT HOOD ASSEMBLY

BACKGROUND OF THE INVENTION

The invention relates to a front-hood arrangement wherein a front hood of a vehicle is coupled to the frame of the vehicle via a hinge, which front hood furthermore can be closed by means of at least one hood lock.

By now, numerous safety devices, such as airbags and the like, for passengers in automobiles are known from practical applications. By contrast, protective measures for pedestrians who are hit by the front end of a passenger automobile have to date scarcely been proposed or implemented in practice. Accidents involving pedestrians which take place at speeds of up to 60 km/h have proven particularly problematical, since, if the pedestrian is hit head-on, his head often strikes the engine hood of the passenger automobile, and the pedestrian dies from his injuries. The seriousness of the injury results from the fact that although the front or engine hood, which is usually formed from thin metal sheet, would tend to bend, it then strikes parts which are arranged beneath the engine hood and in practice cannot be deformed or can only be deformed with difficulty, such as the engine block, the suspension-leg carrier, the air filter, the valve cover or the frame side and cross members of the vehicle. It would be desirable if the consequences of an impact in particular of the head of a pedestrian could be made less severe. By contrast, at speeds of over 60 km/h, the pedestrian, after he has been hit, is thrown over the vehicle.

DE-C-29 22 893 proposes that the engine hood and the wing, in the region of the joint formed between these two parts, be supported, by means of energy-absorbing U-sections which run along the two parts, on body components, and in the event of a collision these U-sections convert the impact into deformation energy. A first drawback of this arrangement is that considerable forces have to act on the sections in order to bend them. Moreover, these otherwise useless U-sections are expensive to procure and difficult to fit.

DE-A-27 37 876 describes an impact protection device which uses a prestressed pivot flap to displace a mesh-like absorption element out of an at-rest position, in which the mesh rests substantially on the front hood, into an absorbing position, which runs substantially in front of the windshield of the automobile. This device is used more to protect the windshield than the pedestrian from an excessively hard impact on the front hood. Moreover, any contact with the sensor which triggers the pivoting movement and is integrated in the front bumper can cause the mesh to be triggered, with the result that a whole range of situations arise in which the mesh completely blinds the driver.

DE-A-28 41 315 describes a safety device in which, in reaction to a signal from a sensor arranged at the front of a vehicle, to detect a collision with a pedestrian, the front hood is displaced out of an at-rest position into an impact position, which is raised with respect to the at-rest position, by a piston-cylinder unit, the displacement being effected by an energy store. During the raising operation, the front hood is pivoted about a horizontal pivot pin which is arranged at the front of the vehicle.

DE-A-197 10 417 describes an arrangement for lifting the front hood in which pivoting about a horizontal pivot pin arranged at the front of the vehicle is triggered by the same pneumatic spring which also assists with the raising of the front hood which is coupled to the other end.

DE-A-197 21 565 describes a safety device on motor vehicles for raising the front hood in which the raising of the front hood takes place in a speed-dependent manner by means of a mechanism which is integral with the hood lock. For this purpose, either the unlocking of the lock which is acted on by a compression spring, which for safety reasons is normally triggered from the driver's compartment, is triggered by a sensor which is triggered by an impact, or alternatively, particularly at relatively high speeds, a piston-cylinder unit which is integrated in the catch bolt of the hood lock is expanded by a propelling charge. A first drawback of this arrangement is that the force required to close the front hood must not exceed a defined threshold, in order to allow the driver to close the front hood with ease. Since the forces which strike in the event of an accident involving a person are considerable, the front hood is pressed down rapidly, and the known injuries occur, in particular in the region of the head. Providing a propelling charge in order to expand a piston-cylinder unit also causes problems, since the service life of this charge, in particular in a relatively unprotected arrangement, is limited, and the charge is difficult to exchange. Moreover, there is a risk of the compression spring and the piston-cylinder unit being triggered simultaneously, with the result that the opening of the front bonnet would become so great that the airstream would bring the hood into contact with the windshield, thus preventing the driver from being able to see.

DE-A-27 11 338 describes a device for damping the impact of a pedestrian, in which an airbag is arranged in the region of the cowl, the filling of which airbag is triggered by a sensor signal. In this case, the airbag may be arranged in such a way that, at the same time, it raises a part of the front hood; to do this it overcomes a spring force which preloads two links, which are connected to one another via a rotation point and one of which is arranged rotatably on the front hood and the other of which is arranged rotatably on a fixed part of the motor vehicle, into an angled position. Furthermore, it is proposed to arrange resilient profiled bodies in strip form in the manner of a seal between hood and side parts, in order in this way to provide further protection in the event of an impact.

DE-A-27 11 339 describes a front hood which is coupled at the front side and in which the coupling is designed to be resilient, in such a manner that it allows a horizontal displacement of the front hood through the impact of a pedestrian, the front hood which is displaced toward the rear being connected at the rear side to one end of a rigid locking element, the other end of which, in the event of displacement of the front hood, is displaced upward and toward the rear in a guide curve in such a manner that the front hood executes an upward movement. This lifting only takes place if horizontal displacement of the front hood has actually occurred, which is not always the case, for example, in the event of impacts of children.

EP-A-0 509 690 describes a front hood, which at its front side is coupled to the vehicle structure in such a manner that, as a result of an impact, the front hood is displaced toward the rear, the closure or pivot means arranged at the rear side, as a result of a movement of the front hood toward the rear, triggering an upward pivoting movement of the front hood, so that the deformation travel of the hood is increased in the event of the impact of a pedestrian. The pivoting movement is guided, for example, by a four joint hinge, which is otherwise used to pivot the front hood when it is desired to release access to the engine and other parts. In this case too, the front hood is only lifted in the event of a very substantial displacement of the front hood, while a weak impact does not displace the front hood toward the rear and therefore upward.

DE-C-30 47 969 describes a front-hood arrangement in which deformation members which, in the event of the impact of a pedestrian on the front hood, resiliently damp the impact, are formed between the front hood and the body outside the hinges.

DE-A-197 12 961 describes the arrangement of a front hood on a vehicle in which a hinge is arranged on a hinge mount, which hinge, in the event of a collision with a pedestrian, is pivoted upward in order to raise the front hood. A problem of this arrangement is that the hood lock for the front hood defines a pivot axis which does not allow optional displacement of the hinge mount, and consequently the hinge mount described is, for example, blocked.

Overall, as yet no solution has been proposed which proposes an inexpensive arrangement, which can be readily restored after use and which is so well developed that it could be used in mass-produced vehicles.

SUMMARY OF THE INVENTION

It is the object of the invention to propose a front-hood arrangement that supplies pedestrian protection that can be achieved inexpensively and on an industrial scale.

This object is achieved for the front-hood arrangement described at the beginning, according to the invention, in that the hinge, in the event of an impact of a pedestrian, undergoes a plastic deformation.

The front-hood arrangement according to the invention, in the event of a collision with a pedestrian, enables the front hood which is arranged to a corresponding degree above the dangerous parts, such as engine block and the like, to be arranged relatively close to these parts, so that the styling of the vehicle does not need to suffer from the higher hood. In a similar manner as that used for desired breaking points, soft elements are inserted in the hinges, allowing controlled deformation in terms of position and orientation as a result of the impact of a body on the front hood, with the result that, at the same time, it is ensured that, firstly, the relative movement about the hood lock which defines a pivot axis of the front hood becomes possible and, secondly, the impact energy effects a defined deformation energy during the plastic deformation of the hinge elements.

According to a preferred refinement of the invention, it is provided that a force which acts substantially normally with respect to the front hood triggers the deformation of the hinge by overcoming low oppositely directed forces, while in the event of an axial compressive load on the vehicle, which is to be expected as the principle direction of load in the event of a head-on collision with another vehicle, the hinge elements which bear the front hood remain substantially unchanged or are scarcely plastically deformed, so that the crash behavior of the vehicle overall is not impaired by the measure used to protect pedestrian who have been struck.

Expediently, the front hood is not only raised at its rear region by the hinge units designed according to the invention with respect to a final position after collision with a pedestrian, but also the hood lock is arranged in a raised position which allows yielding in response to the impact of a human body, the displacement travel of the hood lock being taken into account when designing the desired bending points of the hinge elements.

Designing the hinge elements as plastically deformable connections between front hood and, for example, the frame side member of the motor vehicle ensures that, after the impact of the human body there is no recoil from the prestress of the bent hinge elements which throws the pedestrian back onto the roadway, but rather by far the greatest part of the impact energy is converted into deformation energy and is thus reduced for the pedestrian. This considerable transformation of energy alleviates the impact in particular of a head of a pedestrian in such a manner that it may be life-saving, yet only minor investment costs are required for this measure.

It is possible to couple the plastically deformable hinge elements to the frame side member of the motor vehicle by means of extendable lifting members or the like which enable the front hood, when an impact is detected, for example by a sensor arranged in the front strip of the vehicle or by other suitable means, to be extended upward, the front hood then, by means of a plastic deformation of the upwardly extended hinge elements, being deformed substantially back into its starting position, the specific deformation travel depending on the vehicle speed and the hardness and position of the impact. It should be noted that, when using such lifting members, the time which elapses before the lifting members are extended should if possible be less than $\frac{1}{10}$ second, so that the maximum travel has already been covered when the pedestrian or his head strikes the hood. The extension of the lifting members can be triggered both by pneumatic and hydraulic piston-cylinder units with respect to the units and pyrotechnically or mechanically.

If possible, the deformation travel provided as a result of the front hood being raised above the supporting and solid parts of the engine compartment should be 120 mm and at least 70 mm, in order to ensure a sufficiently long travel for the transformation of the impact energy. In this context, it should be taken into account that the front hood, which is generally produced from sheet metal, in the event of a central impact can itself undergo considerable deformation, and in the event of an eccentric impact the extent of utilization of one of the two front-hood hinges may be greater than that of the other front-hood hinge. However, it is possible, when providing relatively rigid front hoods, for example those made from glass-fiber-reinforced plastics or which have a reinforcing matrix of glass fibers, which reduces the deformation of the front hood itself, which initially increases the danger of the impact, to improve by the inventive transmission of the impact energy to the hinges, so that a significantly higher energy can be absorbed in the hinges and therefore, as a result, lower overall heights can be achieved. This plays a role in particular in the event of a collision with children which takes place in the front region of the front hood and in which the lever arm for the transmission of the forces is different from that involved in a collision with an adult.

A significant advantage of the hinges being designed as plastically deformable parts consists in the fact that these parts can be replaced with little difficulty, for example if they have been inadvertently triggered or after a collision with a pedestrian. Unlike with pyrotechnic charges and the like, a plastic change in the hinge parts remains possible even after the vehicle has been used for a prolonged period. Finally, it should be noted that, in the arrangement according to the invention, the front hood can generally be opened even after the deformation caused by an impact has ended, once the hood lock has been unlocked, so that the state of the engine compartment can be checked quickly following an impact.

It is possible to design any configurations of hinges which are known per se, through execution of plastic deformation, in such a manner that the front hood yields under the impact of a pedestrian and is pivoted out of a raised, ready-to-drive starting position into a lowered position. If the hinge is designed as a single joint, it is expedient for the region which is mounted on the body to be plastically deformable. If the hinge is desired as a multiple-joint hinge, e.g. as a four-joint hinge, it is also possible for one link or expediently a plurality of links or all the links to be plastically deformable.

The plastic deformation is not necessarily restricted to the material of the hinges themselves. Rather, it is possible for energy stores which are designed in the manner of a desired breaking point also to be integrated with the hinge, with the result that the plastic deformation converts energy through the deformation of these energy stores. In particular, parts which can be elongated or sheared off are advantageously used for this purpose.

Further advantages and features of the invention will emerge from the following description and from the dependent claims.

DESCRIPTION OF THE DRAWINGS

The invention is explained in more detail below on the basis of exemplary embodiments and with reference to the appended drawings.

DETAILED DESCRIPTION OF THE INVENTION

Figure 1:
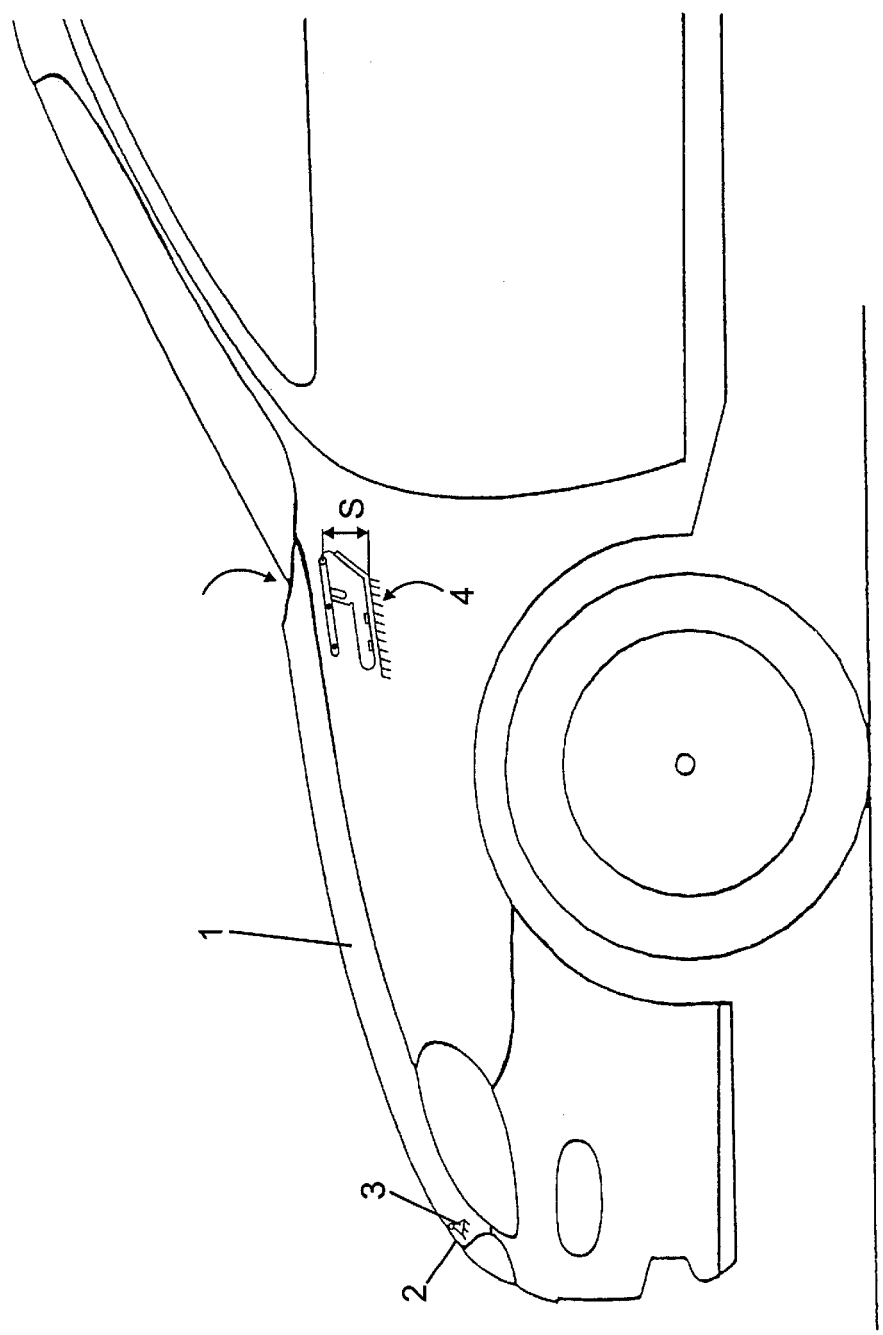
FIG. 1 shows a side view of the front part of a motor vehicle with a front-hood arrangement according to the invention.

The front part of a motor vehicle, which is illustrated in FIG. 1, comprises a front is hood 1, which at its front end 2 can be locked by means of a hood lock 3 and at its rear end, in each case on the outside, is connected to in each case one frame side member of the motor vehicle via one of two hinges 4. The hinge 4 has a first limb 5 which is rigidly connected to the front hood 1 by a screw connection or a riveted connection and the link 6 of which, in the operating state, forms the rotation point of the engine hood 1 when the hood lock 3 is unlocked. The link 6 is secured in a holder 7 attached to the body, a curved guide 8, the catches 9 of which are able to hold the pin which defines the link 6 in a decelerating or clamping manner, being formed in the holder 7. The holder 7 attached to the body comprises a substantially horizontal limb 10 and a limb 11 which is formed substantially at a 45° angle and in the form of a plate and in which the guide 8 is cut out approximately in the form of a quarter of a circle. At the abutment point of the two limbs 10 and 11, the holder 7 has a notch or weakening 12 which runs substantially horizontally and perpendicular to the direction of travel of the motor vehicle and which allows bending of the rear limb 11 away from the front limb 10, which is fixedly screwed or riveted to the frame side member, to such an extent that the limb 11 can be bent away into a position in which both 10, 11 lie horizontally. To prevent excessive bending and therefore to prevent the limb 11 from breaking off, suitable stop means are provided.

The holding force of the catches 9 is sufficient to absorb the dead weight of the front hood 1 when opening without triggering bending of the body-side holder 7. In such a case, the forces which act on the link 6 are of the order of magnitude of approx. 400 N, corresponding to a weight of up to 40 kg, which are distributed over the two hinges 2 and are therefore halved. In the event of an impact of a body, a weight force of 2000 N to 5000 N acts on the front hood 1, and this force, depending on the position of the impact, is distributed evenly or unevenly across the two hinges 4. This force, which is indicated by the arrow F and presses the link 6 and therefore the limb 11 downward, is sufficient to spread open the desired bending point 12 and to effect a pivoting movement of the second limb 11. The pivoting movement of the limb 11, which is indicated by the other arrow G, results, the link 6 being displaced downward in a defined manner in the latch-like guide 8 in accordance with the pivoting radius about the hood lock 3. A large proportion of the impact energy is converted into deformation work at the abutment point 12 of the limbs 10 and 11; it is additionally possible for the latches to clamp the link 6 in a progressively increasing manner and thus likewise to convert impact energy.

As can readily be seen, the load lever about the notch 12 by means of which the force F acts on the limb 11 decreases as the deformation travel increases and therefore requires progressively increasing forces for further plastic deformation produced by bending of the limb 11. This ensures that in a first phase of the impact considerable deformation gradually decreases over the course of time. At the same time, the plastic deformation ensures that there is no springing back which would cause the pedestrian striking the hood to be thrown off the front hood 1. The minimum force F at which an initial deformation of the hinge 4 is triggered may be such that the impact of a child's head in the front region of the front hood 1 already triggers considerable deformation of the hinge 4 while, for example, the impact of an adult's head in the rear region of the front hood, which has a considerably higher energy, substantially entails the full deformation (travel S) of the two hinge elements.

Figure 2:
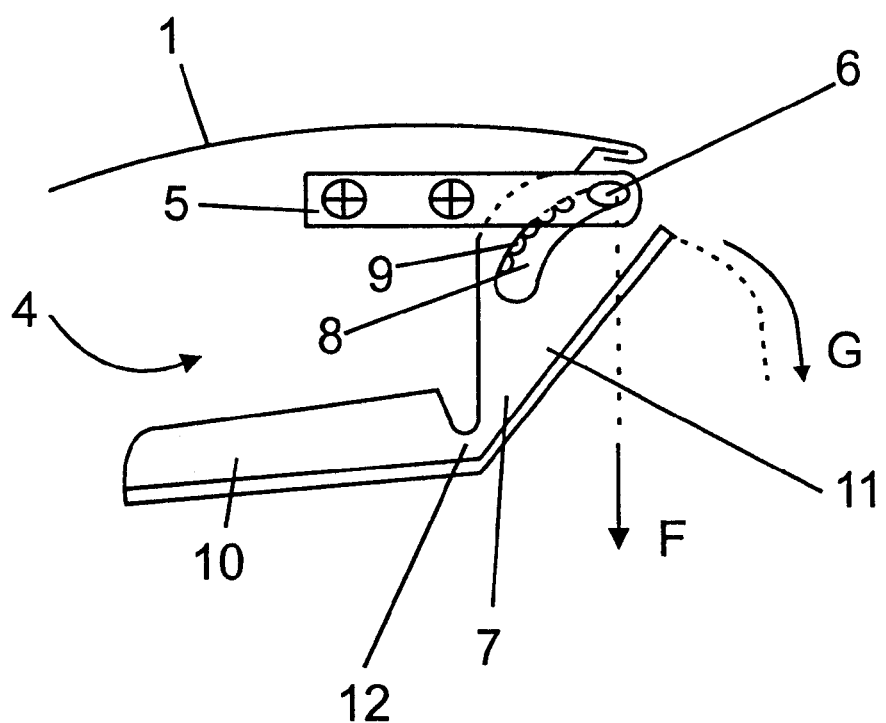
FIG. 2 shows the hinge of the front-hood arrangement shown in FIG. 1.
Figure 3:
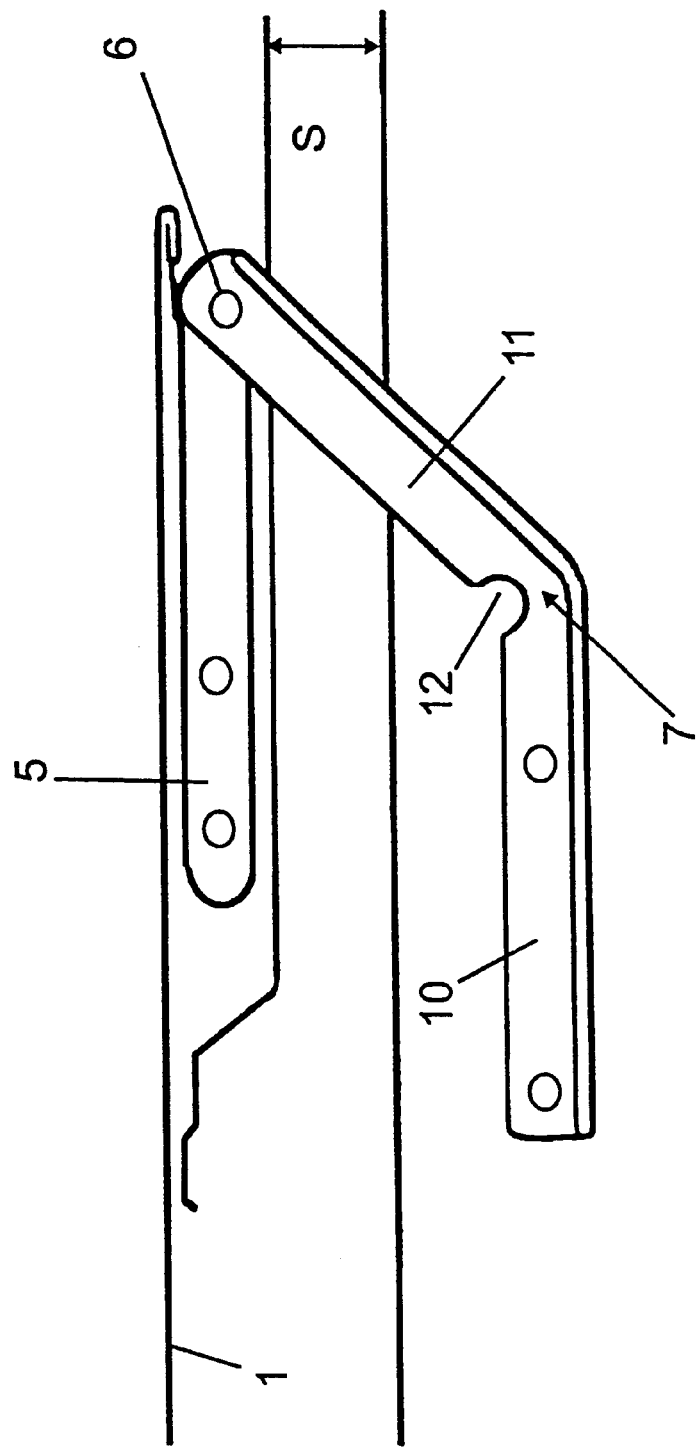
FIG. 3 shows an alternative hinge with a reduced section modulus for a front-hood arrangement according to the invention.

Referring to FIG. 3, a more simple variant of the front-hood hinge, in which there is no guide path provided for the link 6, is illustrated. Identical reference numerals to those used in FIGS. 1 and 2 in this figure denote substantially the same components. This exemplary embodiment is particularly suitable for arrangements of the front hood 1 at resilient hood locks 3 which in particular allow a certain degree of displacement of the front hood 1 toward the rear and in this way absorb energy, with the result that the pivoting radius likewise shifts.

Figure 4:
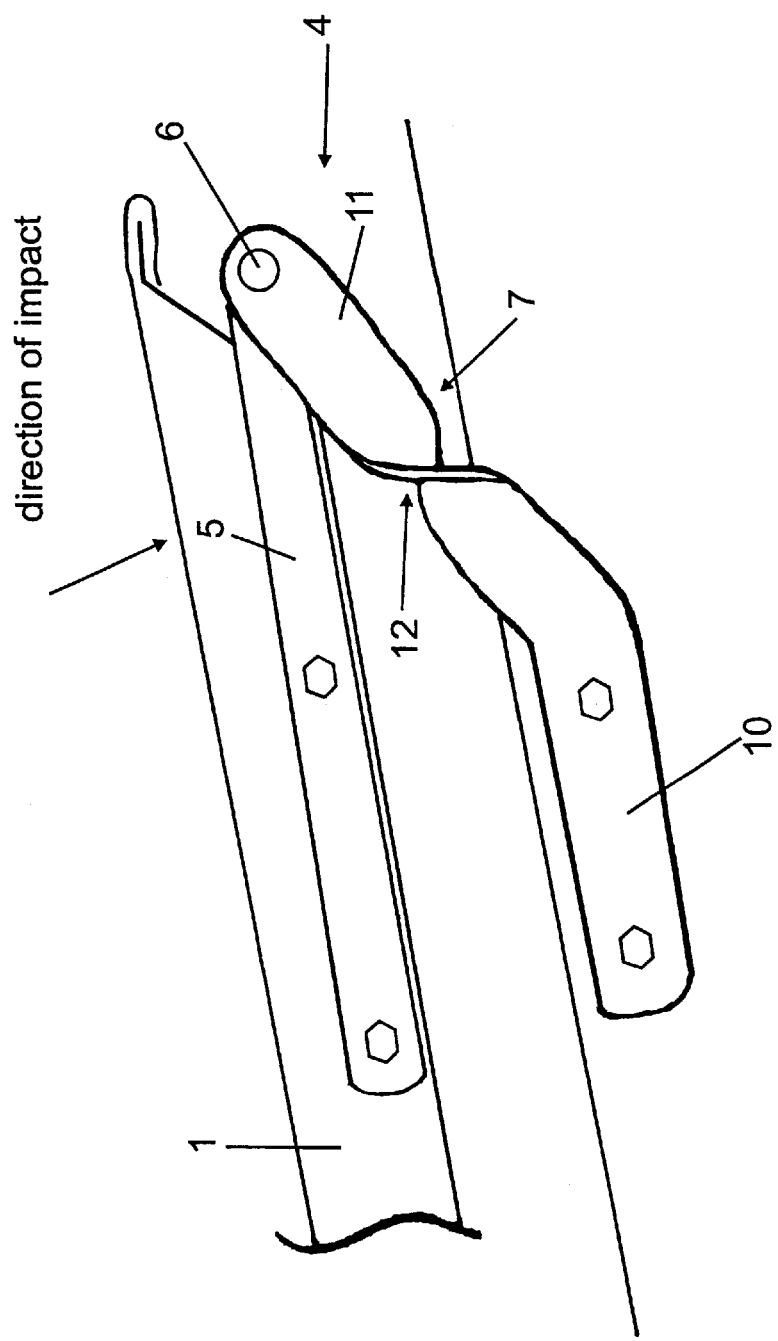
FIG. 4 shows an alternative hinge with a reduced section modulus for a front-hood arrangement according to the invention.

FIG. 4 shows a further exemplary embodiment of a front-cover hinge, in which the limb 11, which is otherwise of flat design, has been turned once through 180°, so that its section modulus under bending loads is reduced. The main advantage of this arrangement is that the strength under tensile load, which is considerable, for example, in the event of a head-on collision of the vehicle in order to keep the passengers safe, is completely retained.

Figure 5:
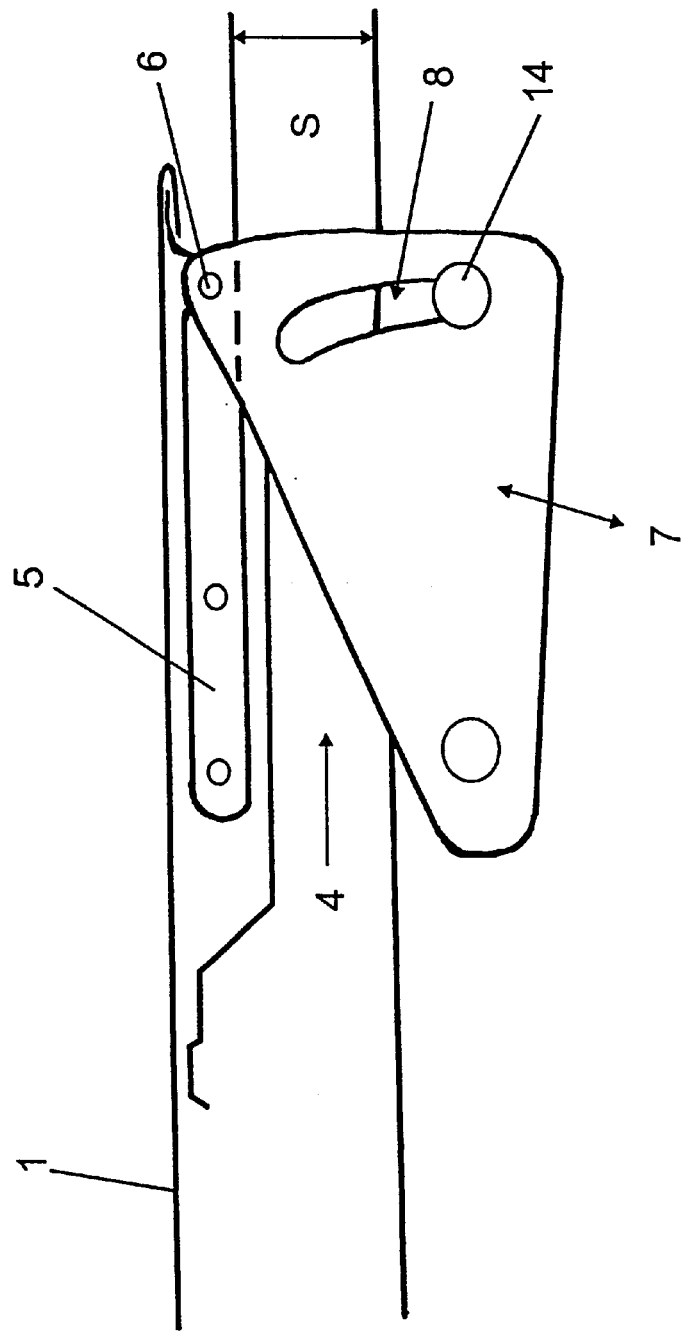
FIG. 5 shows a further alternative hinge for a front-hood arrangement according to the invention.

FIG. 5 shows a further alternative of a front-hood hinge, in which the joint 6 is fixedly connected to that part 7 of the hinge 4 which is arranged on the frame side member, but this plate-like part 7 itself has a guide 8 which, in the form of a curved slot, takes account of the pivoting radius about the hood lock 3. A screw connection 14 provided on the frame side member, together with the part 7, defines a secure friction lock, the shank of the screw connection 14 passing through the guide 8. The guide 8 may be designed to taper gradually, so that if the hinge part 7 is displaced downward in response to the impact of a human body, the deformation energy which needs to be applied increases gradually as the deformation travel progresses. Also, the body of the plate part 7 may be of slightly wedge-shaped design, so that in this respect too an increasing energy is required to complete the deformation.

Figure 6:
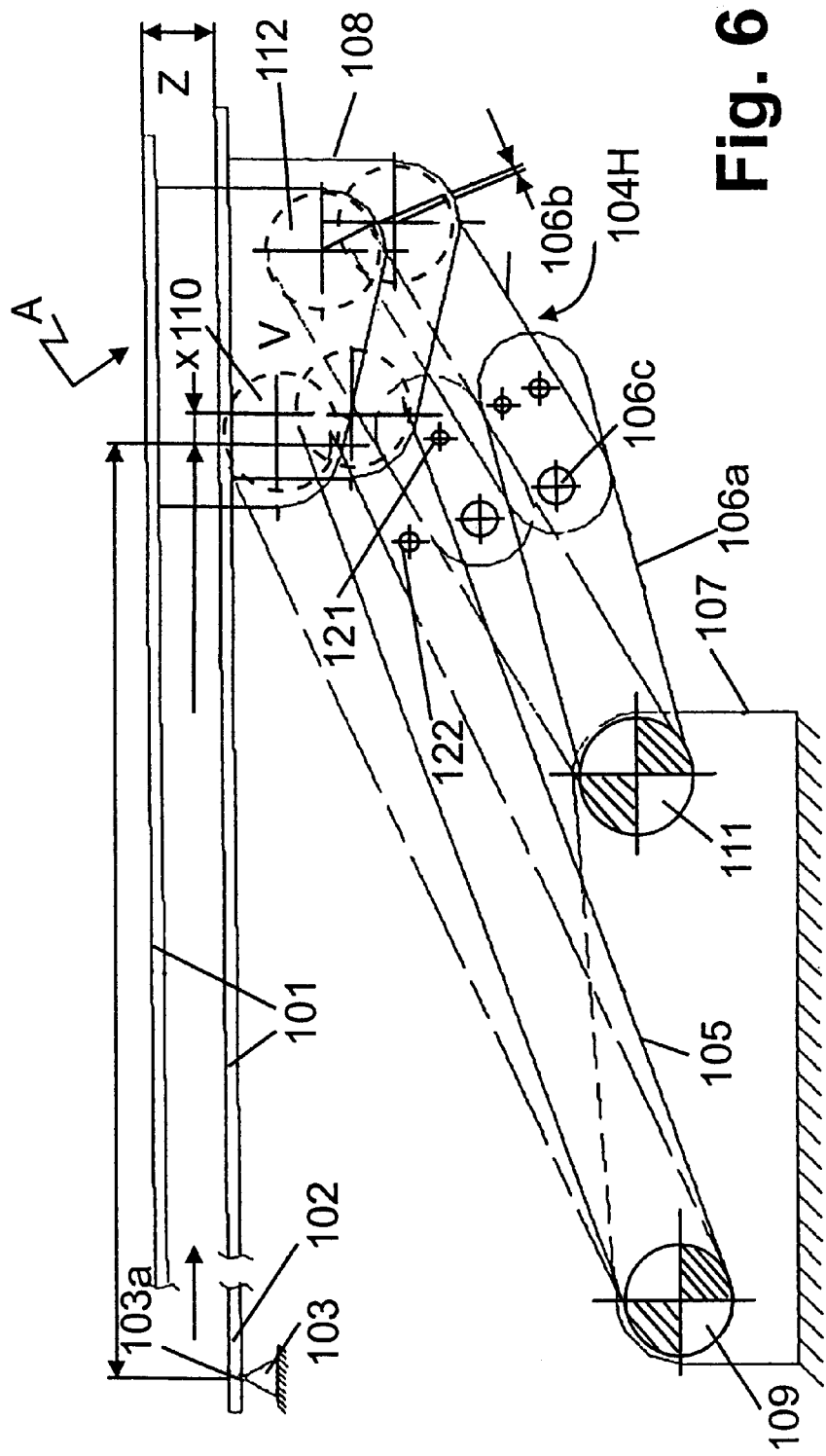
FIG. 6 shows a further alternative hinge for a front-hood arrangement according to the invention.

FIG. 6 shows a further preferred embodiment of a hinge 104. In the present case, the hinge 104 is designed as a four-joint hinge which comprises a longer link 105 and a shorter link 106, the joints of which are coupled pivotably to a part 107 attached to the frame and to a part 108 arranged on the front hood 101. The front hood 101 can be pivoted out of the closed position illustrated in FIG. 1, by pivoting about the joints on the frame part 107, into its open position and back again, the rotary joints of the longer link 105 being denoted by 109 and 110, and the rotary joints of the shorter link 106 being denoted by 111 and 112. It can be seen that all four of the joints 109 to 112 are arranged in a fixed position in the associated frame part 107 or front-hood part 108.

While the longer link 105 is designed as a rigid link, the shorter link 106 is designed as a link which can be separated into two parts and comprises a first partial link 106a, which is assigned to the frame part 107, and a second partial link 106b, which is assigned to the hood part 108. The partial links 106a, 106b are articulately connected to one another by means of a joint 106c which is designed, for example, as a riveted joint, and define a rotary joint. The two partial links 106a, 106b are connected to one another at a rotation about the link 106c by a rigid connection produced by means of a locking member 121 designed as a bolt which can be sheared off. Therefore, the link 106 which is assembled from the partial links 106a, 106b behaves as a rigid link 106 as long as the four-joint hinge 104 is in its closed position or in its open position. As a result of the bolt 121 being sheared off, the shorter link 106 is able to pivot about the joint 106c, with the result that the pivoting path of the front hood 101 produced by the four-joint hinge 104 can be eliminated, and in particular the distance between the axes of the joints 111, 112, which is defined by a rigid link 106, can be varied with respect to the link which is then active between these two axes.

Furthermore, in FIG. 6 122 denotes a stop which is arranged on the hood part 108, so that, when the front hood 101 is closed, it prestresses the short link 106 against the hood securing means. This advantageously leads to unambiguous positioning of the corners of the hood with respect to the A column. The stop 122 is advantageously adjustable, in order to compensate for tolerances of the body and those involved in production of the hinge 104. However, the stop 122 is used in particular to transmit the impact shock to the shear-off bolt 121 in the event of an overload. Alternatively, it is possible to arrange the stop 122 on the body.

In the open position of the four-joint hinge 104, part of the dead weight of the front hood 101 imposes a load on the shorter link 106, which should not buckle under this load, in order to prevent a pivoting-tilting movement of the front hood 101. The shear-off bolt 121 and any further stops are used to suppress the buckling of the short link 106 about the riveted joint 106c. Both in the closed position and in the open position, the length and condition of the shorter link 106 remains substantially unchanged.

FIG. 6 illustrates the overload situation caused by the impact of a pedestrian on the front hood 101 and the resulting deformation of the four-joint hinge 104 overall and in particular of the shorter link 106 in more detail. In FIG. 6, the closed position S is illustrated in dashed lines, while the overload position H caused by the impact of a pedestrian, which is diagrammatically indicated by arrow A, is illustrated in continuous lines. Moreover, FIG. 6 diagrammatically depicts the hood lock 103 which, as can be seen from the diagrammatic illustration, is arranged displaceably on the body, in order to allow a horizontal displacement of the front hood 101 which is associated with pivoting of the front hood 101 about the axis which is formed in the hood lock and is denoted by 103a. It can be seen that the front hood 101, in the region of the hood part 108 mounted on it, executes a displacement travel v, which is illustrated by the arrow drawn on the axis of the rotary joint 110. The travel v is composed of a horizontal component x and a vertical component z, which are likewise shown in FIG. 6. It can therefore be seen that, in the event of a collision with a pedestrian, the front hood is lowered by the amount z, and accordingly reduces its distance from the parts in the engine compartment which may be hard and therefore risk causing injury, while, at the same time, the front hood 101 and therefore also the hood lock 103 are displaced by the amount x toward the rear, as seen in the direction of travel. If the shorter link 106 were, like the longer link 105, of rigid design, the translational movement could not be completed by the four-joint hinge 104, since the four joints 109 to 112 only define one pivoting travel, namely that which forms the basis for the opening movement of the front hood 101, and therefore the translational movement would be statically overdetermined. Since the shorter link 106 is designed so that it can be separated into two parts, the static overdetermination of the four-joint mechanism 104 is eliminated, and the impact energy produced by the impact of a pedestrian on the front hood 101 is converted into the corresponding deformation energy (and into further energy components which reduce the impact for other reasons). The change in position of the axis of the joint 112 of the shorter link 106 is denoted by d in FIG. 6. It can be seen that for a relatively significant vertical displacement, a short effective lengthening of the shorter link 106 is sufficient. It can also be seen that, as a result of the shorter link 106 being separated into two parts, the effective angular position of the two links 105 and 106 with respect to one another has changed slightly, this position otherwise statically determining the four-joint mechanism 4.

Under the load caused by the impact of a pedestrian, the bolt 121 shears off as a result of the shock transmitted by the stop 122, and the rotary joint 106c is released, the resulting underdetermination of the four-joint hinge 104 meaning that the front hood 101 is no longer held in its closed position, but rather drops toward its overload position. The impact energy is in this case converted into the energy required to shear off the bolt 121, so that the actual buckling of the shorter link 106 caused by the pivoting movement about the rotary joint 106c at the same time involves conversion of the impact energy and therefore damping of the impact. The arrangement of the two partial links 106a, 106b and of the shear-off bolt 121 is in this case selected in such a manner that that part of the lower partial link 106a which projects beyond the auxiliary joint 106c does not project into the displacement travel of the front hood 101, where it would form a hard object which could cause injury to a pedestrian, but rather the projecting part is advantageously kept out of the displacement zone of the front hood 101. For example, it is particularly preferably possible to arrange around the joint 106 a torsion spring, one end of which is prestressed against the partial link 106a and the other end of which is prestressed against the partial link 106b and which can be stressed toward dropping of the four-joint hinge 104, in order to reduce the severity of an impact of a pedestrian, but, in its stressing direction, is prevented from pivoting beyond the aligned position of the two partial links 106a, 106b by means of end stops. In this context, it should be noted that the ideally typical portrayal of the links 105, 106 as straight links is the embodiment which is simplest to implement, but it is equally possible for the links 105, 106 to be of curved design, in which case the ideal links would coincide with the axes of the links 105, 106 as described in the exemplary embodiment.

It will be understood that it is also possible for both links 105, 106 to be designed so that they can be separated into two parts in the manner described above, in which case, with regard to intermediate joints provided for each of the two links 105, 106, such as the joint 106c, after the plastic deformation, e.g. as a result of a shearing bolt shearing off, the four-joint mechanism 104 becomes a double four-joint mechanism.

It should be understood that instead of the bolt 121 it is also possible to provide other, including larger parts which, on account of a plastic deformation during the shearing-off or on account of an additional deformation, for example through their design as a spring, are able to store or consume relatively large amounts of energy. In this case, it is in particular not necessary for the two partial links 106a, 106b to be connected to one another via a joint. For example, in a simple manner, it is possible for two separate partial links to be connected to one another to form a rigid link 106 via a connection which can be torn off, such as a covering of, for example, a plastic, such as polyurethane, in which case a collision with a pedestrian, as a result of plastic deformation, tears open the covering and releases the two partial links 106a, 106b, so that the four-joint mechanism 104 is eliminated.

Figure 7:
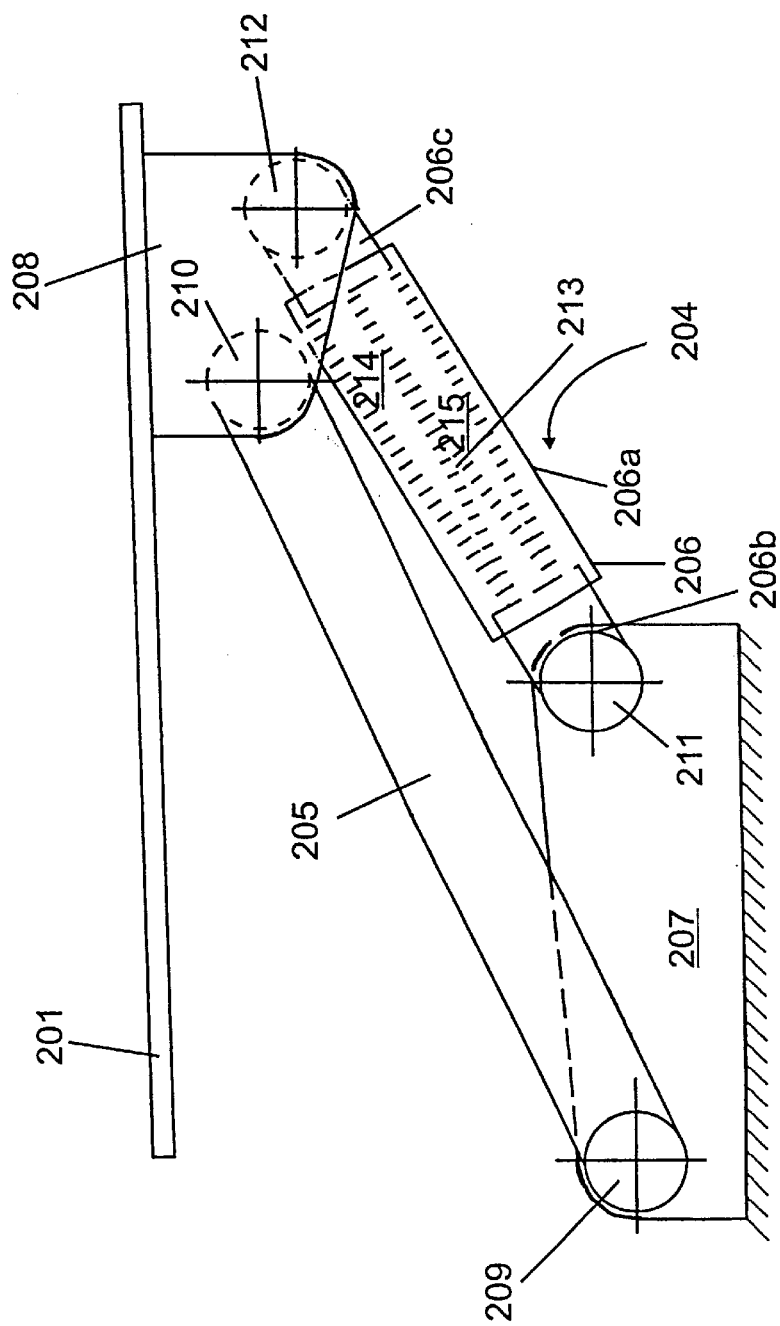
FIG. 7 shows yet another alternative hinge for a front-hood arrangement according to the invention.

FIG. 7 shows yet another preferred embodiment of a hinge 204. The hinge 204 is likewise designed as a four-joint hinge which comprises a longer link 205 and a shorter link 206, the joints of which are pivotably coupled to a part 207 which is secured to the frame and to a part 208 which is arranged on the front hood 201. The front hood 201 can be pivoted out of the closed position illustrated in FIG. 7, by pivoting about the joints on the frame part 207, into its open position and back again, in order to allow access to the engine hood. The rotary joints of the longer link 205 are denoted by 209 and 210, and the rotary joints of the shorter link 206 are denoted by 211 and 212. It can be seen that all four joints 209 to 212 are arranged in a fixed position in the associated frame part 207 or front-hood parts 208.

While the longer link 205 is designed as a rigid link, the shorter link 206, in a central region 206a which is adjoined by the end pieces 206b and 206c which have the same action as the rotary joints 211, 212, is equipped with an energy store 213 which is designed as a deformable unit and allows a permanent change in the length of the shorter link 206, in such a manner that the distance between the axes of the rotary joints 211 and 212 can be changed. To achieve this, the plastically deformable energy store 213 has to be loaded to such an extent that its prestress is overcome, the load being such that it must significantly exceed the dead weight of the front hood 201 arranged on the hood part 208.

A collision with a pedestrian causes the link 206 to be lengthened by expansion of the resistance 213 on account of plastic deformation. In this case, both metallic parts and plastic parts can be permanently expanded or elongated, the energy required for the deformation reducing the severity of the impact.

In addition to an additional compression spring 214, an additional tension spring 215 is also integrated in the section 206a of the shorter link 206, so that the preset distance between the axes of the rotary joints 211, 212 and the length of the shorter link 206 which is represented in the load-free state is maintained. Part of the dead weight of the front hood 201, in the open position of the four-joint hinge 204, exerts a load on the shorter link 206, which is only intended to yield to an insignificant extent under this load, in order to avoid a pivoting-tilting movement of the front hood 201. The compression spring 214 and the tension spring 215 are diagrammatically indicated in FIG. 7 and, in this diagrammatic illustration, serve only to illustrate the different load-free and loaded states of the four-joint hinge 204.

It will be understood that in this case too, both links 205, 206 may be designed to be of variable length. In this case, in addition to lengthening by plastic deformation, compression of the links may also be provided by plastic deformation.

The invention has been explained in more detail above with reference to various exemplary embodiments which have the common general functional principle of an at least locally permanent deformation in the region of the hinge to which the front hood 1 is coupled. It will be understood that the individual measures of the exemplary embodiments can also be combined with one another in order to achieve greater success. In particular, the invention is not restricted to the described examples of hinges, but rather can be used in combination with all known flap hinges for front hoods or tailgates.

What is claimed is:

1. A front hood assembly for attachment to a vehicle, comprising
    a front hood;
    at least one hood lock for closing said front hood, and
    a hinge for coupling said front hood to a frame of said vehicle,
    said hinge comprising a first portion for attachment to said front hood and a second portion for attachment to said frame of the vehicle, said first and second portions being attached to one another via single joint defining a one-joint hinge,
    wherein, in the event of impact of said vehicle with a pedestrian, said hinge undergoes a plastic deformation, and
    wherein said single joint is displaced along a predetermined curved path about said hood lock.

2. The front hood assembly as claimed in claim 1, wherein said second portion attached to said vehicle frame undergoes the plastic deformation.

3. The front hood assembly as claimed in claim 1, wherein one of said first portion and second portion comprises a first part and a second part, wherein said second part is configured to bend with respect to said first part in a bending region disposed between said first part and said second part, and wherein the plastic deformation is induced in said bending region under a load of the pedestrian.

4. The front hood assembly as claimed in claim 3, wherein said first part of said hinge comprises a guide path for guiding displacement of said joint therein, wherein displacement of said joint in said guide path takes place in accordance with displacement of said first part.

5. The front hood assembly as claimed in claim 4, further comprising a latching means arranged in said guide path to decelerate said joint during displacement of said joint in said guide path.

6. The front hood assembly as claimed in claim 3, wherein said second part of said hinge is bent away from said first part of said hinge by up to 45 degrees.

7. The front hood assembly as claimed in claim 1, wherein one of said first portion and said second portion comprises a flat bar that is twisted by 180 degrees.

8. The front hood assembly as claimed in claim 1, wherein said second portion is pivotally attached to said vehicle frame in a manner such that said second portion can pivot about a horizontal axis, such that, in the event of an impact on said front hood, said second portion is pivoted downward about said horizontal axis.

9. The front hood assembly as claimed in claim 8, wherein said second portion comprises a guide path formed therein and a screw connection that passes said guide path, wherein relative movement between said screw connection and said second portion results in one of a widening of said guide path and a deforming of said screw connection.

10. A front hood assembly for attachment to a vehicle comprising:
    a front hood; and
    a hinge for coupling said front hood to a frame of said vehicle, said hinge comprising a first portion for attachment to said front hood and a second portion for attachment to said frame in a raised position,
    said first portion being attached to said second portion via a first joint so as to define a one-joint hinge operable for opening and closing the front hood,
    wherein said second portion is pivotally attached to said frame via a secondary joint inoperable for opening and closing the front hood, said second portion being fastened to said frame by a connecting element, and
    wherein, in the event of impact of said front hood with a pedestrian, a plastic deformation is induced into said connecting element such that said first joint is pivoted in a downward direction about said secondary joint.

11. The front hood assembly as recited in claim 10, wherein said second portion comprises a guide path formed therein,
    wherein said connecting element comprises a screw member passing through said guide path, and
    wherein relative movement between said screw member and said second portion results in a plastic deformation of at least one of said guide path and said screw member.

12. The front hood assembly as claimed in claim 10, wherein said secondary joint is disposed at a distance from said single joint.

13. The front hood assembly as claimed in claim 10, wherein a horizontal axis of said secondary joint is parallel to a joint axis of said first joint.

14. The front hood assembly as claimed in claim 10, wherein said secondary joint is arranged in front of said first joint in a driving direction of the vehicle.

15. The front hood assembly as claimed in claim 10, wherein said single joint, said secondary joint and said connecting element form a triangle and wherein the connecting element and said secondary joint are disposed at approximately the same height.

16. The front hood assembly as claimed in claim 10, wherein said hinge is disposed in the vicinity of a back edge of said front hood.

17. The front hood assembly as claimed in claim 10, wherein said connecting element is a rigid connecting element between said second portion and said frame, and wherein said plastic deformation eliminates said rigid connecting element.

18. A vehicle for resiliently reducing the force of an impact with a pedestrian, said vehicle comprising
    a frame, a front hood, at least two hinges for coupling said front hood to said frame, and at least one hood lock for closing said front hood,
    wherein, in the event of impact of said vehicle with a pedestrian, said front hood is displaced from a raised position in which the front hood is operable using said at least two hinges into a lowered position with respect to said raised position, wherein at least one portion of each of said at least two hinges is adapted to undergo a plastic deformation upon an impact of a pedestrian hitting said hood lock, and
    wherein said at least one portion comprises at least one joint that is displaced over a curved path about said hood lock, wherein said at least one joint is a single joint operable for opening and closing said front hood, and wherein said at least one portion is a portion for attachment of a respective one of said at least two hinges to said frame.

* * * * *